(12) United States Patent
Den Haak et al.

(10) Patent No.: US 11,415,177 B2
(45) Date of Patent: Aug. 16, 2022

(54) SENSORIZED ROLLER FOR A BEARING HAVING INTEGRATED ENERGY HARVESTING DEVICE

(71) Applicant: AKTIEBOLAGET SKF, Gothenburg (SE)

(72) Inventors: Nicolaas Simon Willem Den Haak, Zwijndrecht (NL); Andreas Clemens van der Ham, Utrecht (NL)

(73) Assignee: AKTIEBOLAGET SKF, Gothenburg (SE)

( * ) Notice: Subject to any disclaimer, the term of this patent is extended or adjusted under 35 U.S.C. 154(b) by 14 days.

(21) Appl. No.: 17/131,173

(22) Filed: Dec. 22, 2020

(65) Prior Publication Data

US 2021/0277945 A1  Sep. 9, 2021

(30) Foreign Application Priority Data

Mar. 3, 2020 (DE) .......................... 102020202692.0

(51) Int. Cl.
| | |
|---|---|
| *F16C 41/00* | (2006.01) |
| *F16C 33/34* | (2006.01) |
| *F16C 19/52* | (2006.01) |
| *H02K 7/08* | (2006.01) |

(52) U.S. Cl.
CPC .......... *F16C 41/004* (2013.01); *F16C 19/527* (2013.01); *F16C 33/34* (2013.01); *F16C 41/007* (2013.01); *H02K 7/08* (2013.01); *F16C 2233/00* (2013.01)

(58) Field of Classification Search
CPC .... F16C 19/522; F16C 19/525; F16C 19/527; F16C 33/34; F16C 41/004; F16C 41/007; F16C 2233/00; H02K 7/08
See application file for complete search history.

(56) References Cited

U.S. PATENT DOCUMENTS

| | | | |
|---|---|---|---|
| 10,371,206 B2 | 8/2019 | Ham et al. | |
| 10,491,076 B2 | 11/2019 | Angelis et al. | |
| 10,508,690 B2* | 12/2019 | Ziegler | F16C 41/007 |
| 10,767,703 B2* | 9/2020 | Den Haak | F16C 33/34 |
| 11,226,004 B2* | 1/2022 | Elfert | F16C 41/004 |
| 2014/0157880 A1* | 6/2014 | Matsuda | F16C 19/527 |
| | | | 73/112.01 |

FOREIGN PATENT DOCUMENTS

| | | |
|---|---|---|
| WO | 2015032445 A1 | 3/2015 |
| WO | 2015032449 A1 | 3/2015 |

* cited by examiner

*Primary Examiner* — James Pilkington
(74) *Attorney, Agent, or Firm* — J-Tek Law PLLC; Scott T. Wakeman; Mark A. Ussai

(57) ABSTRACT

A sensorized roller for a bearing includes a bore that extends through the roller, a sensor for measuring at least one physical state of the roller bore and producing a first signal indicative of the measured physical state, a wireless transmitter for receiving the first signal from the sensor and wirelessly transmitting a second signal based on the first signal, and a generator configured to be rotated by a movement of the roller, the generator being electrically connected to the sensor. The measuring unit, the wireless transmitter and the generator are located inside the bore.

19 Claims, 2 Drawing Sheets

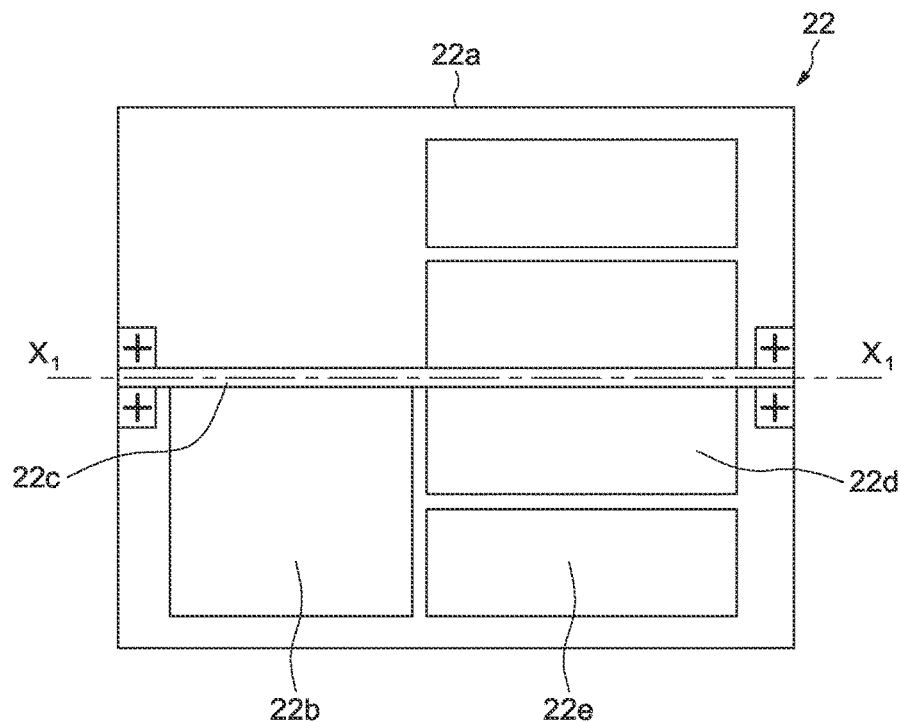
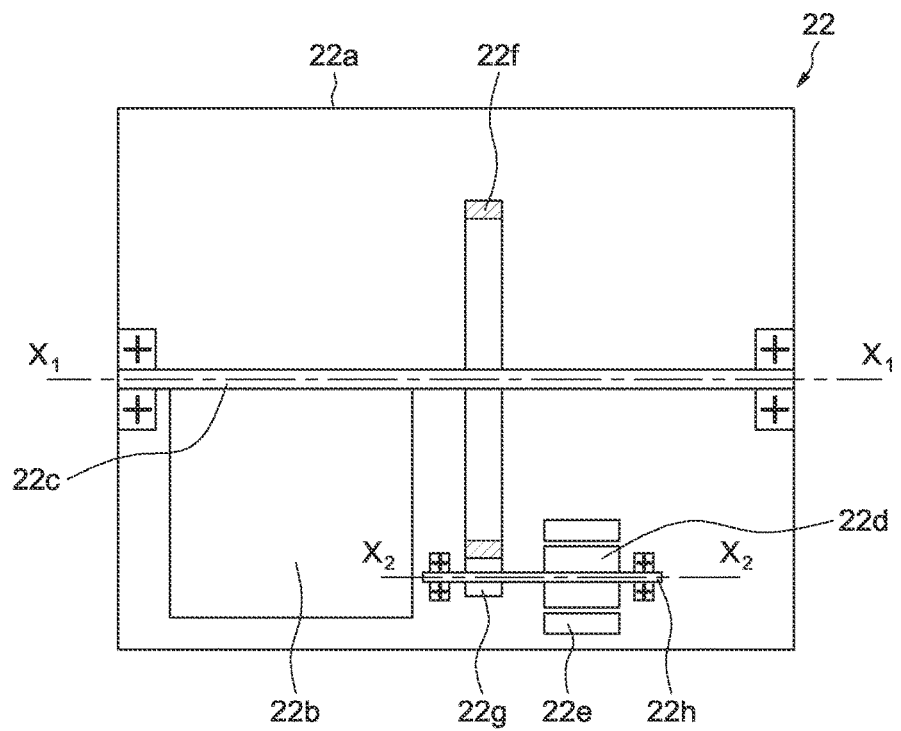

SENSORIZED ROLLER FOR A BEARING HAVING INTEGRATED ENERGY HARVESTING DEVICE

CROSS-REFERENCE

This application claims priority to German patent application no. 10 2020 202 692.0 filed on Mar. 3, 2020, the contents of which are fully incorporated herein by reference.

TECHNOLOGICAL FIELD

The present disclosure is directed to the field of condition monitoring devices, and in particular to condition monitoring sensors for monitoring the condition of a system, such as for example, sensorized rollers.

BACKGROUND

Condition monitoring devices allow the condition of a system to be monitored without the need for manual inspection. These devices may be particularly advantageous in remote locations or locations which are difficult and/or dangerous to access, such as axles and/or bearings of a railway system.

Generally, electrical sensors are used to gather vibration measurements or other measurements that may then be analyzed to determine the condition of a machine and to detect any machine defects.

In many situations, it may be convenient for the condition monitoring devices to be powered by an integrated generator. Indeed, it may be necessary to provide electric energy to devices that are located in remote locations, for example where either power supply infrastructure does not exist or, if an infrastructure does exist, power is not available at the specific location where the device is installed.

It is known to use a battery pack or a limited capability power source such as an energy harvester to power condition monitoring devices.

However, the use of a battery significantly limits the number of measurements that can be performed on the bearing.

Document U.S. Pat. No. 10,491,076 B2 (SKF) discloses a bearing arrangement including a rotating part, a non-rotating part and an energy generating system that comprising micro generator modules each having an eccentric mass at an eccentric shaft along a radial rotating axis. Each eccentric shaft is connected to a generator with its axis in the radial direction. Energy is generated when the eccentric masses are rotated by rotating the rotating part of the bearing. The stator of the generator does not rotate along the radial axis of the microgenerators.

It is also known to provide energy harvesting systems inside the cage of a bearing, as explained in documents WO 2015/032449 A1 (SKF) and WO 2015/032445 A1 (SKF). However, not all bearings have a cage.

SUMMARY

The aim of the present invention is to provide integrated generation source (generator) for powering condition monitoring devices mounted on any types of roller bearings.

One aspect of the present disclosure is to provide a sensorized roller for a bearing comprising a roller bore that extends through the roller, a measuring unit for measuring at least one physical state of the roller bore, a processor for receiving the signal from the measuring unit and configured to transmit said signal to an external receiver and an energy harvesting device configured to generate power and to power the measuring unit.

The measuring unit, the processor and the energy harvesting device are mounted in an insert fitted within the roller.

It is thus possible to provide energy harvesting for sensorized rollers without using a cage.

For example, the measuring unit, the processor and the energy harvesting device may be mounted in an insert fitted within the roller bore.

Advantageously, the energy harvesting device comprises an electrical generator having an axis arranged along an axis of the bore of the sensorized roller and configured to produce energy from the rotation of said sensorized roller.

The electrical generator may comprise an eccentric mass rigidly fixed to a main shaft of said electrical generator extending along the axis of the roller bore, a rotor fixed to said shaft and stator coils mounted in a stator rigidly fixed inside the insert and configured to be rotated by the rotation of the sensorized roller.

In other words, the eccentric mass or weight is driven by gravity and centrifugal force to maintain the main shaft of the generator during rotation of the sensorized roller. The rotation of sensorized roller drives the rotation of the stator and thus the stator coils of the generator.

According to an embodiment, the rotor is directly fixed to the main shaft. In other words, the generator is a direct drive generator.

According to another embodiment, the rotor is fixed to the main shaft through at least two gear wheels.

Advantageously, the energy harvesting device comprises energy harvesting electronics connected to the stator coils.

The energy harvesting device may comprise at least one battery or capacitor configured to provide electrical power to the measuring unit and to be charged by the energy harvesting electronics.

According to an embodiment, the insert does not axially extend beyond the lateral walls of the roller.

The insert may be made of plastic material or elastic material.

For example, the insert may be suspended, tight fitted, screwed or fixed inside the roller bore with any suitable fixation means.

According to a second aspect, the invention relates to a bearing having a rotation axis and comprising an inner ring, an outer ring, and a row of rollers mounted radially between raceways provided on said inner and outer rings. At least one of the rollers is a sensorized roller as described above. The roller bore of said roller extends through the roller about an axis.

The axis may be parallel to the axis of rotation of the bearing parallel or inclined with an angle comprises between 10° to 45° with said axis of rotation of the bearing, for example when using tapper rollers.

BRIEF DESCRIPTION OF THE DRAWINGS

The present invention and its advantages will be better understood by studying the detailed description of specific embodiments given by way of non-limiting examples and illustrated by the appended drawings on which:

FIGS. 3 and 4 are detail views of an electrical generator mounted in the insert of FIG. 2, according to two embodiments.

DETAILED DESCRIPTION

The expressions "outer" and "inner" refer to radial positions relative to the rotation axis X-X of the bearing, the inner parts being closer to said rotation axis than the outer parts.

Figure 1:
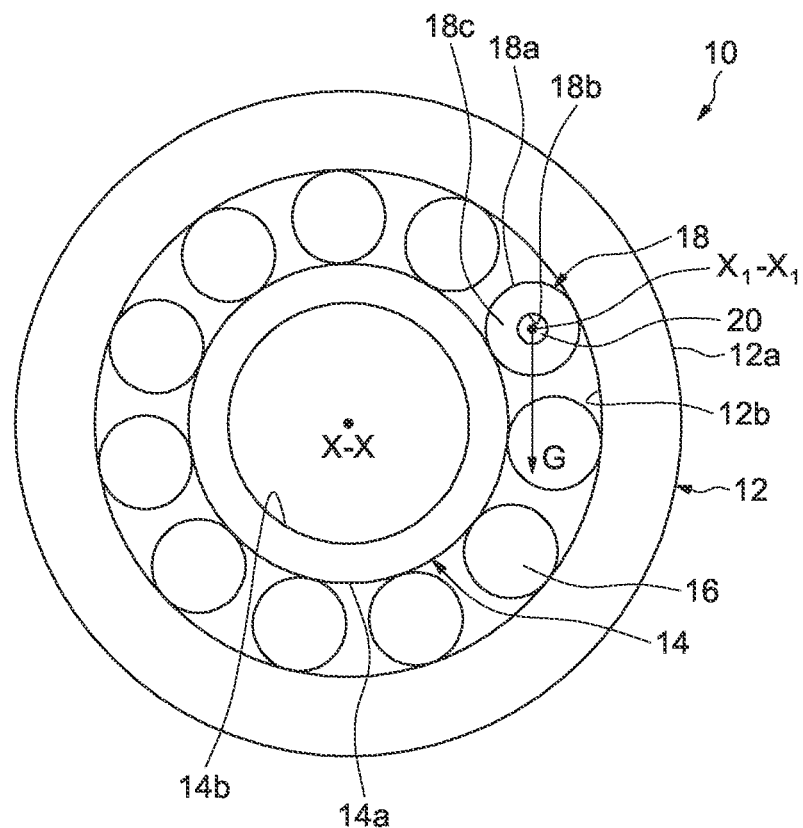
FIG. 1 is a schematic view of a roller bearing having a sensorized roller according to an embodiment of the invention.

Referring to FIG. 1, which illustrates an embodiment of a roller bearing 10, for example, designed to support the main shaft of a wind turbine (not shown). The roller bearing 10 comprises an outer ring 12, an inner ring 14 and one row of rolling elements 16, such as rollers, arranged between the inner and outer rings 12, 14. As illustrated, the roller bearing 10 does not include a cage for maintaining a circumferential spacing of the rolling elements. However, it is also possible to provide a sensorized roller according to the present disclosure in a roller bearing that has a cage.

The outer ring 12 and the inner ring 14 of the bearing 10 are in the form of concentric rings rotatable around the rotation axis X-X of the bearing 10, the outer ring 12 radially surrounding the inner ring 14.

As illustrated, the outer ring 12 is radially delimited by an outer cylindrical surface 12a and an inner cylindrical surface 12b having a raceway for the rollers 16. The outer ring 12 further comprises two opposite radially extending, axially facing frontal surfaces (not referenced) which axially delimit the inner cylindrical surface 12b and the outer cylindrical surface 12a.

As illustrated, the inner ring 14 is radially delimited by an outer cylindrical surface 14a having a raceway for the rollers 16 and an inner cylindrical surface 14b in radial configured to contact a shaft (not shown). The inner ring 14 further comprises two opposite radially extending, axially facing frontal surfaces (not referenced) which axially delimit the inner cylindrical surface 14b and the outer cylindrical surface 14a of the inner ring 14.

The row of rollers 16 comprises one sensorized roller 18. As an alternative, the row of rollers may comprise a different number of sensorized rollers, for example two or more.

The sensorized roller 18 is radially delimited by an outer cylindrical surface 18a and a bore 18b and axially delimited by two opposite lateral surfaces 18c. The bore 18b of the roller 18 extends axially from one of the lateral surfaces 18c to the other lateral surface 18c.

The sensorized roller 18 rotates along a first rotational axis X1-X1 parallel to the rotational axis X-X of the roller bearing 10. The rotational axis X1-X1 may also be at an angle with the rotation X-X of the bearing, for example when the rollers are tapers rollers. In this case, the contact angle of the taper roller bearing is not zero.

As a non-limiting example, in the illustrated embodiment, the rollers are cylindrical rollers, but may be any other types of rollers, such as taper rollers.

The bore 18b of the sensorized roller 18 is advantageously a through hole or through bore. As an alternative, the axial length of the bore 18b may be smaller than the axial length of the roller 18 such that the bore is a blind bore.

The bearing 10 further comprises a cylindrical insert 20 fitted in the hollow bore 18b of the roller 18.

Figure 2:
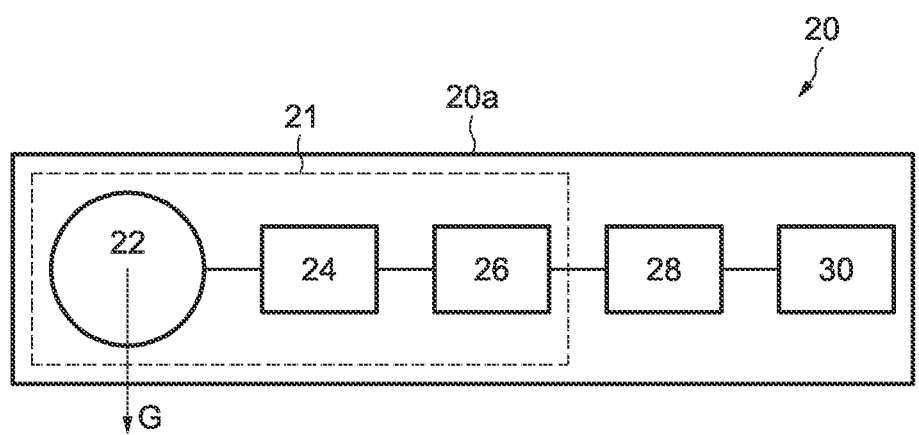
FIG. 2 is a detail view of an insert provided inside the bore of the sensorized roller of FIG. 1.

The cylindrical insert 20 is explained in detail in reference with FIG. 2.

As illustrated, the cylindrical insert 20 comprises a housing 20a inside which are mounted an energy harvesting device 21, a measuring unit 28 for measuring at least one physical state of the roller bore 18b and a processor 30 for receiving the signal from the measuring unit 28 and configured to transmit said signal to an external receiver (not shown), via for example a wireless transmission device.

As illustrated, the housing 20a of the insert 20 does not axially extend beyond the lateral walls 18c of the sensorized roller 18. The housing 20a of the insert matches the shape of the roller bore 18b.

For example, the insert 20 may be made from an elastic material.

The outer diameter of the insert 20 is substantially equal to the inner diameter of the bore 18b of the sensorized roller 18, such that the insert is press fitted inside said bore.

As an alternative, the insert 20 may be screwed or fixed inside the roller bore 18b with any suitable fixation means, as long as it maintains an elastic interface with the roller bore.

For example, the insert 20 may made of plastic or another rigid material having at least 50 micrometers separation coaxially between the bore 18b and the insert 20.

The preferred implementation is to use a plastic insert 20 that is suspended inside the bore 18b using O-rings (not shown) that also serve the purpose of hermitically sealing the electronics from the outside of the roller 18 where lubricant resides.

Such implementation is described in document U.S. Pat. No. 10,371,206 A1 (SKF).

The measurement unit 28 comprises one or more condition monitoring devices, such as sensors for measuring for example deformation of the roller bore 18b.

The energy harvesting device 21 is configured to generate power and to power the measuring unit 28.

The energy harvesting device 21 comprises an electrical generator 22 having an axis along the axis X1-X1 of the sensorized roller 18 and configured to produce energy using the rotation of said sensorized roller 18.

The energy harvesting device 21 further comprises energy harvesting electronics 24 connected to the generator 22 and a battery 26 configured to provide electrical power to the measuring unit 28 and to be charged by the energy harvesting electronics 24.

As shown in details in FIGS. 3 and 4, the electrical generator 22 comprises a stator 22a rigidly fixed to the housing 20a of the insert 20, an eccentric mass or weight 22b rigidly fixed to a main shaft 22c having an axis along the first axis X1-X1, a rotor 22d fixed to said shaft 22c and stator coils 22e mounted in the stator 22a and configured to be rotated by the rotation of the sensorized roller 18.

In other words, the eccentric mass 22b is driven by gravity G and centrifugal force to maintain the main shaft 22c of the generator 22 when rotation of the sensorized roller 18 along the first rotation axis X1-X1. The rotation of said sensorized roller drives the rotation of the stator 22a and thus the stator coils 22e of the generator 22. The stator coils 22e are connected to the energy harvesting electronics 24.

In the example shown in FIG. 3, the generator 22 is a direct drive generator.

In the example shown in FIG. 4, the generator 22 comprises two gear wheels 22f, 22g between the main shaft 22c supporting the eccentric mass 22b and an auxiliary shaft 22h supporting the rotor 22d. The auxiliary shaft 22h extends along a second axis X2-X2 parallel to the first axis X1-X1.

In any case, the stator 22a and thus the stator coils 22e of the generator 22 rotate along the first axis X1-X1 coaxial with the axis of the sensorized roller and parallel to the rotation axis X-X of the roller bearing 10.

Thanks to the invention, the measurement unit located inside the roller may be powered with an energy harvesting device, whether the bearing comprise a cage or not.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved sensorized bearings having integrated energy harvesting devices.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A sensorized roller for a bearing comprising:
a bore that extends through the roller,
a measuring unit for measuring at least one physical state of the roller bore and producing a signal indicative of the measured physical state,
a processor for receiving the signal from the measuring unit and transmitting said signal to an external receiver, and
an energy harvesting device for generating power from movement of the roller and providing the power to the measuring unit,
wherein the measuring unit, the processor and the energy harvesting device are located inside the bore,
wherein the energy harvesting device includes an electrical generator, a main shaft, and an eccentric mass rigidly fixed to the main shaft, the electrical generator including a rotor coupled to the main shaft and stator coils mounted in a stator rigidly fixed inside the bore, and
wherein the eccentric mass and the main shaft are configured to be rotated about an axis of rotation of the main shaft by rotation of the sensorized roller.

2. The sensorized roller according to claim 1, wherein the axis of rotation of the main shaft lies along a longitudinal axis of roller bore.

3. The sensorized roller according to claim 1, wherein the rotor is directly fixed to the main shaft.

4. The sensorized roller according to claim 1, wherein the rotor is coupled to the main shaft through at least two gear wheels.

5. The sensorized roller according to claim 1, including energy harvesting electronics connected to the stator coils.

6. The sensorized roller according to claim 5, including at least one battery and/or capacitor configured to provide electrical power to the measuring unit and to be charged by the energy harvesting electronics.

7. The sensorized roller according to claim 1, wherein the measuring unit comprises a sensor.

8. The sensorized roller according to claim 1, wherein said processor includes a wireless transmitter.

9. The sensorized roller according to claim 1,
wherein the measuring unit, the processor and the energy harvesting device are located in an insert mounted inside the bore.

10. The sensorized roller according to claim 9, wherein the roller includes axial end walls and wherein the insert does not axially extend beyond the end walls of the roller.

11. The sensorized roller according to claim 9, wherein the insert is made of plastic.

12. A bearing having a rotational axis and comprising:
an inner ring,
an outer ring, and
a row of rollers mounted radially between the inner ring and the outer ring,
wherein at least one of the rollers comprises a sensorized roller according to claim 1.

13. A bearing having a rotational axis and comprising:
an inner ring,
an outer ring, and
a row of rollers mounted radially between the inner ring and the outer ring,
at least one of the rollers comprising a sensorized roller, the sensorized roller comprising:
a bore,
a measuring unit for measuring at least one physical state of the roller bore and producing a signal indicative of the measured physical state,
a processor for receiving the signal from the measuring unit and transmitting said signal to an external receiver, and
an energy harvesting device for generating power from movement of the roller and providing the power to the measuring unit,
wherein the measuring unit, the processor and the energy harvesting device are located inside the bore, and
wherein the bearing is cageless.

14. The sensorized roller according to claim 13,
wherein the measuring unit, the processor and the energy harvesting device are located in an insert mounted inside the bore.

15. A sensorized roller for a bearing comprising:
a bore that extends through the roller,
a sensor for measuring at least one physical state of the roller bore and producing a first signal indicative of the measured physical state,
a wireless transmitter for receiving the first signal from the sensor and wirelessly transmitting a second signal based on the first signal, and
a generator configured to be rotated by a movement of the roller, the generator being electrically connected to the sensor,
wherein the generator comprises:
a first shaft extending along a rotational axis of the roller and being mounted for rotation relative to the roller,
an eccentric mass mounted to the shaft,
a first gear mounted on the shaft for rotation with the shaft,
a stator fixed relative to the roller, a rotor mounted on a second shaft inside the stator, the second shaft being radially spaced from the first shaft, and a second gear on the second shaft, the second gear engaging the first gear, wherein the sensor, the wireless transmitter and the generator are located inside the bore.

16. The sensorized roller according to claim 15, including a processor configured to receive the first signal from the sensor and to send the second signal to the wireless transmitter.

17. The sensorized roller according to claim 15, wherein the sensor, the wireless transmitter and the generator are located in an insert housing and the insert housing is mounted in the bore.

18. A bearing having a rotational axis and comprising:

an inner ring, an outer ring, and a plurality of rollers mounted radially between the inner ring and the outer ring, wherein at least one of the rollers comprises a sensorized roller according to claim 15.

19. The bearing according to claim 18, wherein the bearing is a cageless bearing.

* * * * *